United States Patent [19]

Tsuge et al.

[11] Patent Number: 4,553,625

[45] Date of Patent: Nov. 19, 1985

[54] AUTOMOBILE SEAT BELT SYSTEM WITH AUTOMATIC UNLOCKING FUNCTION

[75] Inventors: Noboru Tsuge, Kariya; Masahiro Taguchi, Okazaki, both of Japan

[73] Assignee: Nippon Soken, Inc., Nishio, Japan

[21] Appl. No.: 525,542

[22] Filed: Aug. 22, 1983

[30] Foreign Application Priority Data

Aug. 30, 1982 [JP] Japan .................................. 57-150455

[51] Int. Cl.⁴ ............................................. B60R 21/10
[52] U.S. Cl. .................................... 180/268; 180/270; 280/801; 24/603
[58] Field of Search ................ 180/268, 270; 280/801; 24/603, 656

[56] References Cited

U.S. PATENT DOCUMENTS

| | | | |
|---|---|---|---|
| 3,194,582 | 7/1965 | Kutz | 180/268 |
| 3,963,090 | 6/1976 | Hollins | 180/270 |
| 4,228,567 | 10/1980 | Ikesue et al. | 24/656 |
| 4,432,119 | 2/1984 | Schwark et al. | 24/603 |

FOREIGN PATENT DOCUMENTS

| | | | |
|---|---|---|---|
| 257890 | 8/1963 | Australia | 180/268 |
| 609286 | 2/1979 | Switzerland | 180/268 |

*Primary Examiner*—Joseph F. Peters, Jr.
*Assistant Examiner*—Kenneth R. Rice
*Attorney, Agent, or Firm*—Cushman, Darby & Cushman

[57] ABSTRACT

A seat belt system comprising a seat belt retractor, a seat belt, a tongue plate secured at an intermediate position of the seat belt, and a buckle which has a locking function and an unlocking function for the tongue plate. An actuator and its controller are provided for automatically actuating the unlocking function of the buckle.

22 Claims, 5 Drawing Figures

AUTOMOBILE SEAT BELT SYSTEM WITH AUTOMATIC UNLOCKING FUNCTION

BACKGROUND OF THE INVENTION

1. Field of the Invention

The present invention relates to an automobile seat belt system with an automatic unlocking function.

2. Description of the Prior Art

Seat belt systems are used in automobiles for protecting the driver and passengers. A conventional seat belt system comprises a seat belt retractor anchored to the automobile frame, a seat belt consisting of a shoulder belt connected to the retractor and a lap belt directly anchored to the automobile frame, a tongue plate secured at an intermediate position of the seat belt, i.e., at a position between the shoulder belt and the lap belt, and a buckle anchored to the automobile. This buckle has a mechanism for locking the tongue plate and a mechanism for unlocking the tongue plate.

In the prior art, the unlocking mechanism has had to be manually operated. This has aggravated the drivers' and passengers' dislike of using the seat belt system. In addition, if an accident occurs, manual operation may significantly delay the exit of drivers and passengers from the automobiles.

SUMMARY OF THE INVENTION

It is an object of the present invention to provide an automobile seat belt system in which an unlocking function is automatically performed, thereby making it easier to use the seat belt system and, in addition, to make it easier to exit an automobile if an accident occurs.

According to the present invention, an actuator and its controller are added for providing an automatic unlocking function.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
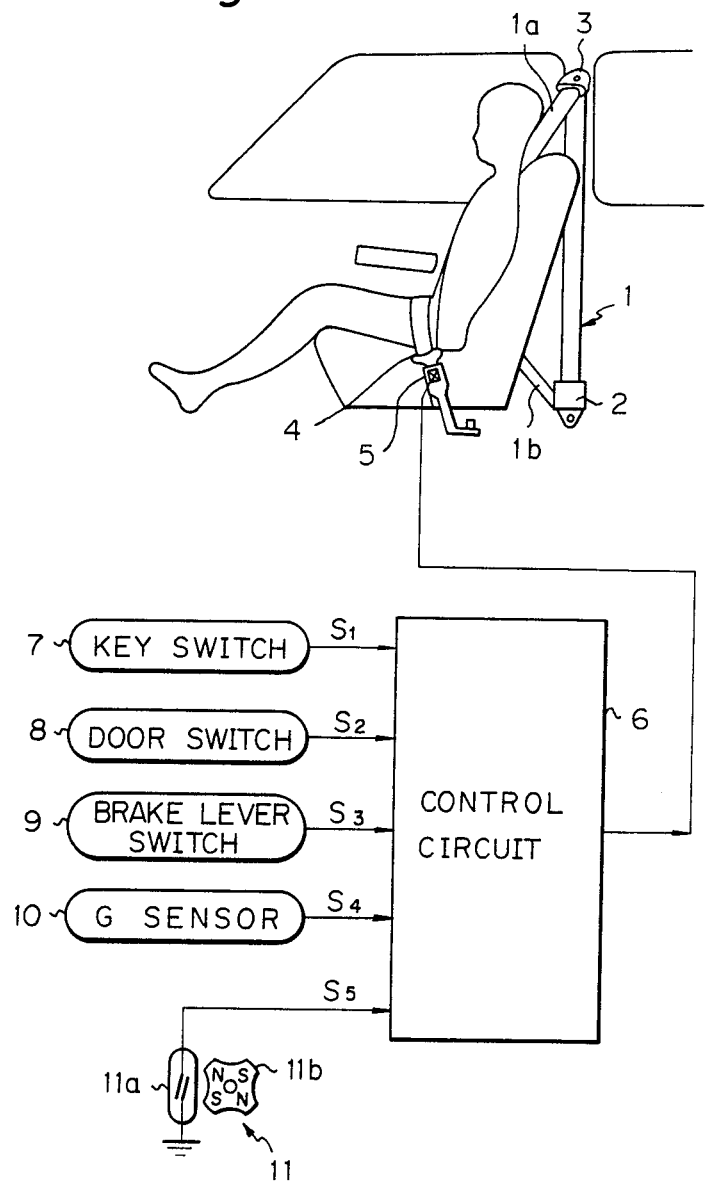
FIG. 1 is a schematic view of an embodiment of the seat belt system according to the present invention.

In FIG. 1, a seat belt 1 is divided into a shoulder belt 1a and a lap belt 1b. The shoulder belt 1a holds the upper part of the driver and passengers, while the lap belt 1b holds the lower part of the driver and passengers. Note that, however, the shoulder belt 1a and the lap belt 1b form a single seat belt.

One end of the seat belt 1 is secured to a seat belt retractor 2 anchored to the automobile frame, while the other end of the belt 1 is anchored directly to the automobile frame. A slip joint 3 anchored to the automobile frame is provided for guiding the belt 1.

A tongue plate 4 is secured at an intermediate position of the seat belt 1. The tongue plate 4 can be connected to a buckle 5 anchored to the automobile frame on the opposite side of the seat. For this purpose, the buckle 5 has a mechanism for locking the tongue plate 4 and a mechanism for unlocking the tongue plate 4.

According to the present invention, the unlocking mechanism of the buckle 5 is controlled by a control circuit 6 which receives various sense signals $S_1$, $S_2$, ..., $S_5$. These signals are generated from a key switch 7, a door switch 8, a brake lever switch 9, a deceleration sensor (G sensor) 10, and a vehicle velocity sensor 11.

The door switch 8 is located at a door (not shown). When the door is open, the sense signal $S_2$ has a high potential ($= +5$ V), while when the door is closed, the sense signal $S_2$ has a low potential ($= 0$ V). The brake lever switch 8 is located at a brake lever (not shown). When the brake is applied with the brake lever, the sense signal $S_3$ has a high potential ($= 5$ V), while when the brake is released by the brake lever, the sense signal $S_3$ has a low potential ($= 0$ V). The G sensor 10, located at a portion of the automobile, detects whether the deceleration of the automobile exceeds a predetermined value. For example, if the automobile collides with another automobile, the G sensor 10 operates so that the sense signal $S_4$ has a high potential ($= 5$ V). The vehicle velocity sensor 11 is comprised of a lead switch 11a and a permanent magnet 11b coupled to a speedometer cable (not shown). When the speedometer cable is rotated, the lead switch 11a performs an on/off operation so as to generate a pulse-shaped signal which has a frequency proportional to the velocity.

Figure 2:
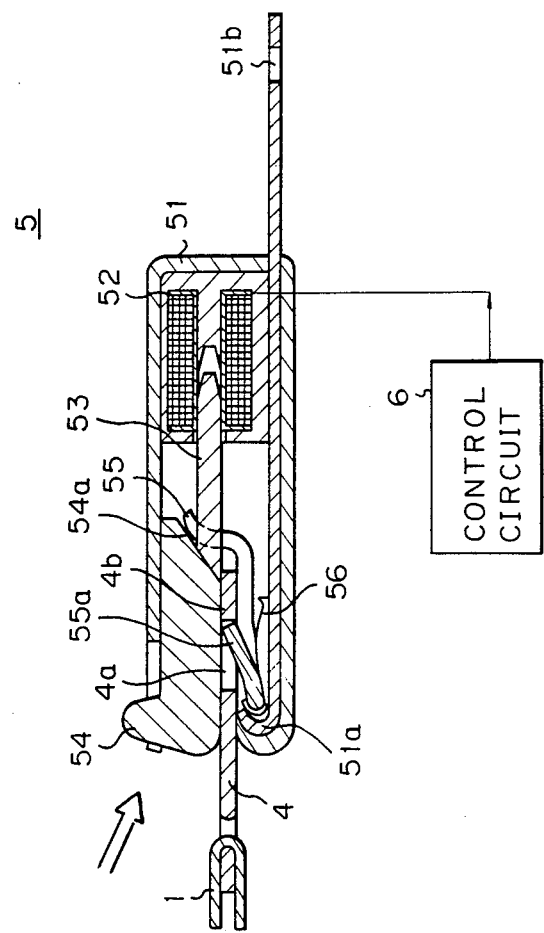
FIG. 2 is a cross-sectional view of the buckle of FIG. 1.

The buckle 5 will be explained with reference to FIG. 2. In FIG. 2, reference numeral 51 designates a case, 52 a solenoid, and 53 an operating shaft fixed to a slide button 54. The slide button 54 has a tapered face 54a contacting a lever 55. The slide button 54, associated with the operating shaft 53, is capable of moving within the case 51.

The lever 55 has a salient portion 55a which penetrates through a hole 4a of the tongue plate 4 and is contact with a face 4b of the tongue plate 4.

A spring 56 is provided between the case 51 and the lever 55 for pushing the lever 55 and is rotatably fixed to a curled portion 51a of the case 51.

A hole 51b is provided for anchoring the buckle 5 to the automobile frame by a bolt.

Figure 3:
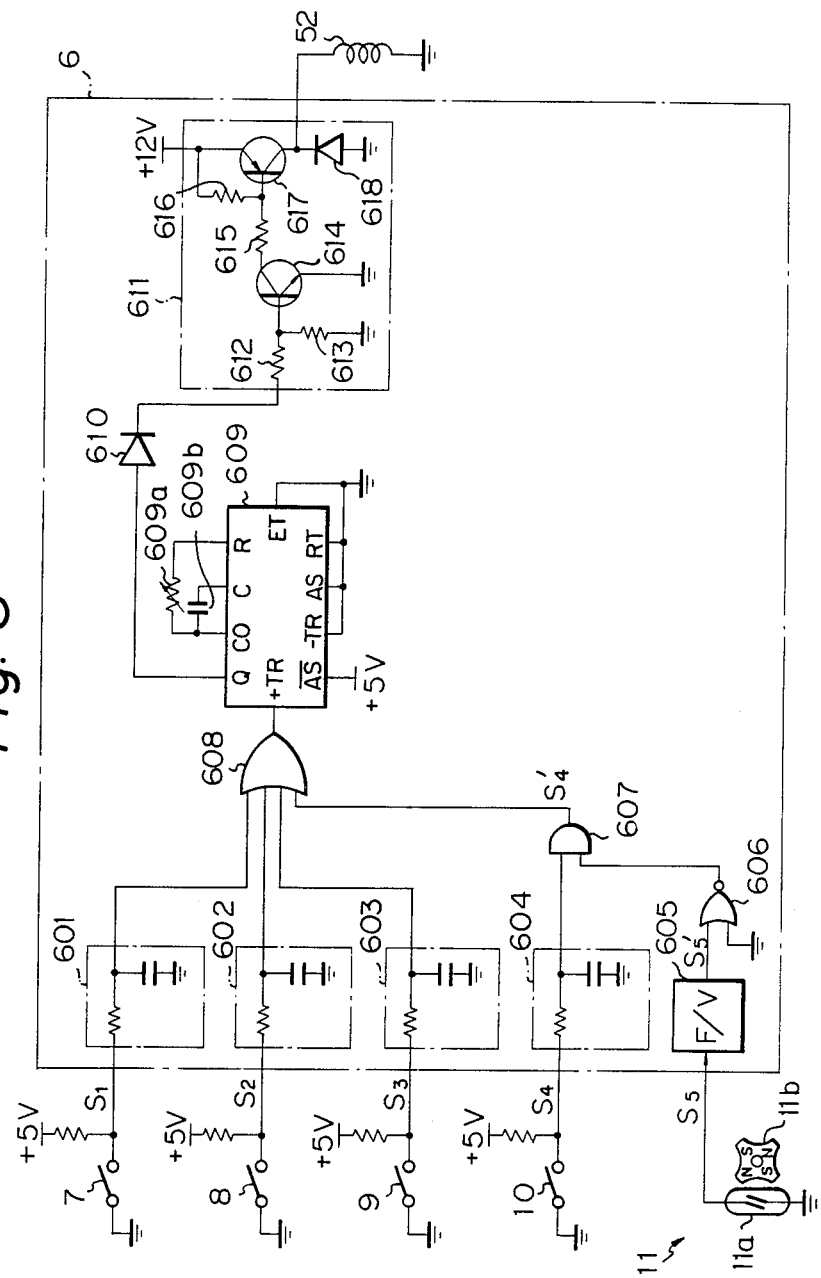
FIG. 3 is a diagram of the control circuit of FIG. 1.

The control circuit 6 will be explained with reference to FIG. 3. In FIG. 3, reference numerals 601 through 604 are resistor-capacitor (RC) delay circuits (filters) for receiving the signals $S_1$ through $S_4$, respectively. A frequency/voltage converter 605 receives the pulse-shaped signal $S_5$ and generates a signal $S_5'$ having a voltage proportional to the velocity. This signal $S_5$ is supplied to a NOR circuit 606, which also receives a ground level signal. That is, the NOR circuit 606 serves as a comparator for comparing the velocity with zero. The NOR circuit generates a high potential ($= 5$ V) only when the velocity equals zero. In addition, an AND circuit 607 is connected to the outputs of the delay circuit 604 and the NOR circuit 606. Therefore, the AND circuit 607 generates a high potential ($= 5$ V) only when the signal $S_4$ has a high potential and the velocity equals zero.

Reference numeral 608 designates an OR circuit, 609 a monostable multivibrator, 610 a diode, and 611 a solenoid driving circuit. The monostable multivibrator 609 is triggered by a positive-rising edge of an input signal thereof and generates an output signal having a constant time duration, which is determined by a resistor 609a and a capacitor 609b. That is, when one or more of the signals S₁, S₂, S₃, and S₄' rises, the monostable multivibrator 609 generates an output signal and transmits it via the diode 610 to the solenoid driving circuit 611.

The solenoid driving circuit 611 comprises resistors 612, 613, a transistor 614, resistors 615, 616, a transistor 617, and a diode 618. In the solenoid driving circuit 611, when the output of the monostable multivibrator 609, i.e., the output of the diode 610, is high (=5 V), the transistor 614 is turned on. Accordingly, the transistor 615 is turned on so as to energize a solenoid 52.

Note that the emitter of the transistor 617 receives a higher potential (=12 V) directly from a battery (not shown).

Returning to FIG. 1, the seat belt retractor 2 usually includes a spiral spring or a motor for imparting a winding force to the seat belt 1. Therefore, the seat belt 1 always is under tension.

Now assume that the seat belt 1 binds the driver (or passenger). Accordingly, the seat belt 1 (the tongue plate 4) is locked in the buckle 5. When leaving the automobile, the driver usually first turns off the engine with the key switch 7, whereby the monostable multivibrator 609 (FIG. 3) is operated. Therefore, the solenoid 52 is energized for the predetermined time period.

In FIG. 2, when the solenoid 52 is energized, the solenoid 52 generates an electromotive force which attracts the operating shaft 53. As a result, the operating shaft 53 is moved to the right direction. Accordingly, the slide button 54 is also moved to the right direction. Simultaneously, the slide button 54 pushes down the lever 55 by the tapered face 54a. Accordingly, the salient portion 55a is also pushed down and is released from the hole 4a of the tongue plate 4. In this state, the spring 56 is depressed. On the other hand, since the seat belt 1 is under tension from the retractor 2, it pulls the tongue plate 4 out from the buckle 5. Thus, the driver is released from the seat belt 1.

Similarly, when the driver opens the door, door switch 8 is activated. When operating the brake lever, the brake lever switch 9 is activated. In both these cases, the seat belt 1 is automatically released. Further, if the automobile collides with another automobile or obstacle, the G sensor 10 is activated. In this case, after automobile is stopped, the seat belt 1 is released, and the driver can easily leave the automobile.

Note that the switches 8 and 9 can be connected between the battery (12 V) and the solenoid 52. In this case, the open/close characteristics of the switches would be opposite to those of the above-mentioned embodiment. In addition, when the switch 8 or 9 is closed, the solenoid 52 would remain in an energized state.

In addition, a hydraulic actuator or a pneumatic actuator can be used instead of the solenoid 52.

Of course, the unlocking mechanism of the buckle 5 can be manually operated. In this case, the slide button 54 is pushed by the hand as indicated by the arrow in FIG. 2.

Figure 4:
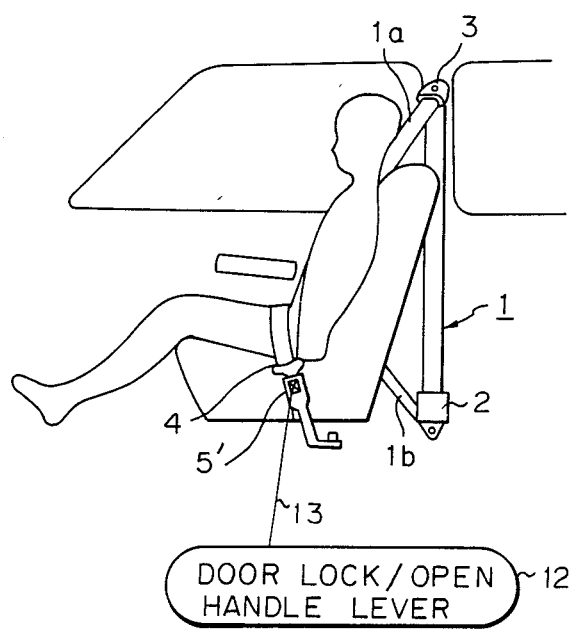
FIG. 4 is a schematic view of another embodiment of the seat belt system according to the present invention.

In FIG. 4, which illustrates another embodiment of the present invention, a buckle 5' is controlled mechanically by a door lock/open handle lever 12. A cable 13 is provided between the buckle 5' and the door lock/open handle lever 12. In this embodiment too, the unlocking operation of the buckle 5' can be automatically performed.

Figure 5:
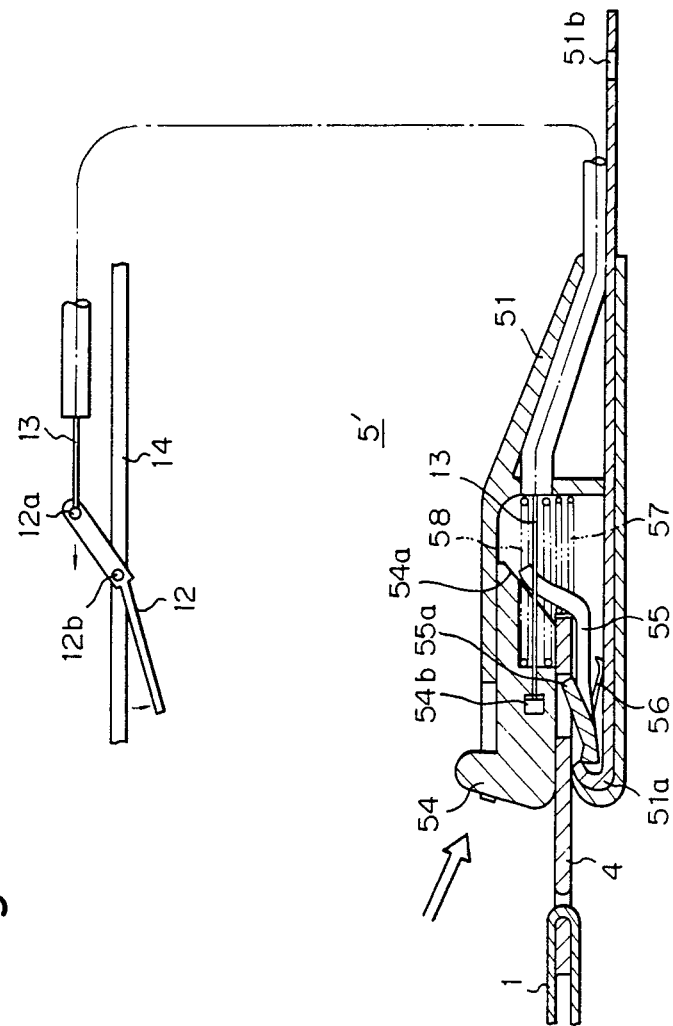
FIG. 5 is a cross-sectional view of the buckle of FIG. 4.

The structure of the buckle 5' will be explained with reference to FIG. 5. In FIG. 5, elements the same as those of FIG. 2 are denoted by the same reference numerals. The elements 52 and 53 of FIG. 2 are absent in FIG. 5, and, instead of this, the elements 57 and 58 are provided in FIG. 5.

In FIG. 5, when the slide button 54 is moved to the right direction, the lever 55 associated with the salient portion 55a is pushed down. As a result, the tongue plate 4 is released from the buckle 5' due to the presence of the spring 57. The slide button 54 is connected to an end of the cable 13. The other end of the cable 13 is connected to a portion 12a of the lever 12. The lever 12 is rotatably secured by a shaft 12b to a door frame 14.

A spring 58 is provided for pushing the slide button 54 to the left direction.

The buckle 5' of FIG. 5 operates as follows. The driver rotates the lever 12 as indicated by the arrows to release the locked state of the door. Simultaneously, since the cable 13 is connected to the lever 12 at the portion 12a, the cable 13 moves the slide button 54 to the right direction. As a result, the lever 55 and the salient portion 55a are pushed down. Accordingly, the tongue plate 4 is pushed out of the buckle 5' by the spring 57.

Of course, in this embodiment, the unlocking operation of the buckle 5' can also be manually performed. In this case, since a space 54b is provided at the connection between the slide button 54 and the cable 13, a manual unlocking operation will not conversely operate the door lock/open lever 12.

The cable 13 can be connected to the brake lever instead of the door lock/open lever.

We claim:

1. A seat belt system for an automobile, comprising:
   a seat belt retractor anchored to a frame of said automobile;
   a seat belt having one end anchored to said automobile frame and another end secured to said retractor;
   a tongue plate secured at an intermediate position of said seat belt;
   a buckle anchored to said automobile frame, said buckle having a means for locking said tongue plate and a means for unlocking said tongue plate;
   a means for actuating said unlocking means; and
   a means for controlling said actuating means wherein said locking means comprises a salient portion rotatably supported at one end of said buckle and a spring for pushing said salient portion, said tongue plate having a hole for receiving said salient portion; and wherein
   said unlocking means comprises a lever associated with said salient portion, and a slide button having a tapered portion in contact with said lever.

2. A system as set forth in claim 1, wherein said controlling means comprises a cable connected to said slide button and to a handle lever for locking a door of said automobile.

3. A system as set forth in claim 1, wherein said controlling means comprises a cable connected to said slide button and to a brake lever.

4. A seat belt system for an automobile, comprising:
   a seat belt retractor anchored to a frame of said automobile;
   a seat belt having one end anchored to said automobile frame and another end secured to said retractor;
   a tongue plate secured at an intermediate position of said seat belt;

a buckle anchored to said automobile frame, said buckle having a means for locking said tongue plate and a means for unlocking said tongue plate;
means for selectively actuating said unlocking means; and
means for controlling said actuating means, wherein said controlling means includes a means for detecting whether a brake lever of said automobile is turned on and a means for driving said actuating means to actuate said unlocking means a predetermined time period after said brake lever is turned on.

5. A system as set forth in claim 4, wherein said actuating means comprises an electrical actuator.

6. A system as set forth in claim 4, wherein said controlling means further comprises:
means for detecting whether a key switch of said automobile is turned on or off; and
means for driving said actuating means to actuate said unlocking means for a predetermined time period after said key switch is turned off.

7. A system as set forth in claim 4, wherein said controlling means further comprises:
means for detecting whether a door of said automobile is open or closed; and
means for driving said actuating means to actuate said unlocking means for a predetermined time period after said door is opened.

8. A system as set forth in claim 4, wherein said controlling means further comprises:
means for detecting whether a door of said automobile is open or closed; and
means for driving said actuating means to actuate said unlocking means when said door is open.

9. A system as set forth in claim 4, wherein
said locking means comprises a salient portion rotatably supported at one end of said buckle and a spring for pushing said salient portion, said tongue plate having a hole for receiving said salient portion; and
said unlocking means comprises a lever associated with said salient portion, and a slide button having a tapered portion in contact with said lever.

10. A seat belt system for an automobile, comprising:
a seat belt retractor anchored to a frame of said automobile;
a seat belt having one end anchored to said automobile frame and another end secured to said retractor;
a tongue plate secured at an intermediate position of said seat belt;
a buckle anchored to said automobile frame, said buckle having a means for locking said tongue plate and a means for unlocking said tongue plate;
means for selectively actuating said unlocking means; and
means for controlling said actuating means, wherein said controlling means includes a means for detecting whether a brake lever of said automobile is turned on, and a means for driving said actuating means to actuate said unlocking means when said brake lever is turned on.

11. A system as set forth in claim 10 wherein said actuating means comprises an electrical actuator.

12. A system as set forth in claim 10, wherein said controlling means further comprises:
means for detecting whether a key switch of said automobile is turned on or off; and
means for driving said actuating means to actuate said unlocking means for a predetermined time period after said key switch is turned off.

13. A system as set forth in claim 10, wherein said controlling means further comprises:
means for detecting whether a door of said automobile is open or closed; and
means for driving said actuating means to actuate said unlocking means for a predetermined time period after said door is opened.

14. A system as set forth in claim 10, wherein said controlling means further comprises:
means for detecting whether a door of said automobile is open or closed; and
means for driving said actuating means to actuate said unlocking means when said door is open.

15. A system as set forth in claim 10, wherein
said locking means comprises a salient portion rotatably supported at one end of said buckle and a spring for pushing said salient portion, said tongue plate having a hole for receiving said salient portion; and
said unlocking means comprises a lever associated with said salient portion, and a slide button having a tapered portion in contact with said lever.

16. A seat belt system for an automobile, comprising:
a seat belt retractor anchored to a frame of said automobile;
a seat belt having one end anchored to said automobile frame and another end secured to said retractor;
a tongue plate secured at an intermediate position of said seat belt;
a buckle anchored to said automobile frame, said buckle having a means for locking said tongue plate and a means for unlocking said tongue plate;
means for selectively actuating said unlocking means; and
means for controlling said actuating means, wherein said controlling means includes
means for detecting whether deceleration of said automobile exceeds a predetermined value,
means for detecting whether velocity of said automobile is zero, and
means for driving said actuating means to actuate said unlocking means for a predetermined time period after the deceleration of said automobile exceeds said predetermined value and the velocity of said automobile becomes zero.

17. A system as set forth in claim 16, wherein said actuating means comprises an electrical actuator.

18. A system as set forth in claim 16, wherein said controlling means further comprises:
means for detecting whether a key switch of said automobile is turned on or off; and
means for driving said actuating means to actuate said unlocking means for a predetermined time period after said key switch is turned off.

19. A system as set forth in claim 16, wherein said controlling means further comprises:
means for detecting whether a door of said automobile is open or closed; and
means for driving said actuating means to actuate said unlocking means for a predetermined time period after said door is opened.

20. A system as set forth in claim 16, wherein said controlling means further comprises:

means for detecting whether a door of said automobile is open or closed; and means for driving said actuating means to actuate said unlocking means when said door is open.

21. A system as set forth in claim 16, wherein said locking means comprises a salient portion rotatably supported at one end of said buckle and a spring for pushing said salient portion, said tongue plate having a hole for receiving said salient portion; and said unlocking means comprises a lever associated with said salient portion, and a slide button having a tapered portion in contact with said lever.

22. A seat belt system for an automobile comprising:

a seat belt retractor anchored to a frame of said automobile;

a seat belt having one end anchored to said automobile frame and another end secured to said retractor;

a tongue plate secured at an intermediate position of said seat belt;

a buckle anchored to said automobile frame, said buckle having a means for locking said tongue plate and a means for unlocking said tongue plate;

means for selectively actuating said unlocking means; and means for controlling said actuator means, wherein said locking means comprises a salient portion rotatably supported at one end of said buckle and a spring for pushing said salient portion, said tongue plate having a hole for receiving said salient portion, said unlocking means comprises a lever associated with said salient portion, and a slide button having a tapered portion in contact with said lever, and said controlling means comprises a cable connected to said slide button and to a brake lever of said automobile.

* * * * *